(12) United States Patent
Gornowicz et al.

(10) Patent No.: US 10,198,844 B2
(45) Date of Patent: *Feb. 5, 2019

(54) EFFICIENT AND STABLE APPROACH TO ELASTICITY AND COLLISIONS FOR HAIR ANIMATION

(71) Applicant: DreamWorks Animation LLC, Glendale, CA (US)

(72) Inventors: Galen G. Gornowicz, Sierra Madre, CA (US); Silviu Borac, Pacifica, CA (US)

(73) Assignee: DreamWorks Animation L.L.C., Universal City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/264,489

(22) Filed: Sep. 13, 2016

(65) Prior Publication Data

US 2017/0098327 A1    Apr. 6, 2017

Related U.S. Application Data

(63) Continuation of application No. 14/171,729, filed on Feb. 3, 2014, now Pat. No. 9,443,341.

(51) Int. Cl.
*G06T 13/40* (2011.01)
*G06T 17/00* (2006.01)
(Continued)

(52) U.S. Cl.
CPC ............ *G06T 13/40* (2013.01); *G06F 17/12* (2013.01); *G06K 9/52* (2013.01); *G06T 7/20* (2013.01);
(Continued)

(58) Field of Classification Search
None
See application file for complete search history.

(56) References Cited

U.S. PATENT DOCUMENTS

| | | |
|---|---|---|
| 5,442,569 A | 8/1995 | Osano |
| 2010/0156902 A1 | 6/2010 | Kim et al. |
| 2010/0277475 A1 | 11/2010 | McAdams et al. |

OTHER PUBLICATIONS

Benzi, Michele. "Preconditioning techniques for large linear systems: a survey." Journal of computational Physics 182.2 (2002): 418-477.*

(Continued)

*Primary Examiner* — Zhengxi Liu
(74) *Attorney, Agent, or Firm* — Dentons US LLP

(57) ABSTRACT

One exemplary process for animating hair includes receiving data representing a plurality of hairs and a plurality of objects in a timestep of a frame of animation. A first tree is populated to represent kinematic objects of the plurality of objects and a second tree is populated to represent dynamic objects of the plurality of objects based on the received data. A first elasticity preconditioner is created to represent internal elastic energy of the plurality of hairs based on the received data. Based on the first tree and the second tree, a first set of potential contacts is determined between two or more hairs of the plurality of hairs or between one or more hairs of the plurality of hairs and one or more objects of the plurality of objects. Positions of the plurality of hairs are determined based on the first set of potential contacts and the first elasticity preconditioner.

27 Claims, 10 Drawing Sheets

(51) Int. Cl.
　　　G06K 9/52　　(2006.01)
　　　G06T 7/20　　(2017.01)
　　　G06F 17/12　　(2006.01)
(52) U.S. Cl.
　　　CPC ........ *G06T 17/005* (2013.01); *G06T 2210/12* (2013.01); *G06T 2210/21* (2013.01)

(56) References Cited

OTHER PUBLICATIONS

Baraff et al., "Large Steps in Cloth Simulation", Proceedings of ACM SIGGRAPH, ACM Press, Jul. 19-24, 1998, pp. 43-54.
Bergen, Gino Van Den, "Efficient Collision Detection of Complex Deformable Models using AABB Trees", Journal of Graphics Tools, vol. 2, No. 4., Nov. 6, 1998, pp. 1-14.
Bergou et al., "Discrete Elastic Rods" SIGGRAPH ACM Transaction on Graphics, vol. 27, No. 3, Aug. 2008, pp. 63:1-63:12.
Bergou et al., "Discrete Viscous Threads", SIGGRAPH ACM Transaction on Graphics, vol. 29, No. 4, Jul. 2010, 10 pages.
Catto et al., "Iterative Dynamics with Temporal Coherence", available at https://www.cmpevents.com/sessions/GD/IterativeDynamics.pdf, Feb. 14, 2005, 24 Pages.
Catto, Erin, "Iterative Dynamics with Temporal Coherence", In Proc. of the Game Developers Conference, Feb. 22, 2005, pp. 1-24.
Daviet et al., "A Hybrid Iterative Solver for Robustly Capturing Coulomb Friction in Hair Dynamics", ACM Transactions on Graphics, vol. 30, No. 6, Dec. 2011, 12 pages.
Extended European Search Report Received for European Patent Application No. 15153342.9, dated Oct. 23, 2015, 17 Pages.
Golub et al., "Matrix Computations", The Johns Hopkins University Press, 1996, 367 pages.
Gornowicz et al., "Efficient and Stable Approach to Elasticity and Collisions for Hair Animation", Proceedings of the 2015 Symposium on Digital Production, DIGIPRO '15, Jan. 1, 2015, pp. 41-49.
Kim et al., "Continuous Collision Detection for Adaptive Simulation of Articulated Bodies", International Journal of Computer Graphics, vol. 24, No. 4, Jan. 8, 2008, pp. 261-269.
Kirchhoff, Von Herrn G., "Ueber Das Gleichgewicht und Die Bewegung Eines Unendlich Dunnen Elastichen Stabes", Journal fur die reine und angewandte Mathematik, vol. 56, 1859, pp. 285-313.
Levien, Raph, "The Elastica: A Mathematical History", Tech. Rep., University of California, Berkeley, Aug. 23, 2008, pp. 1-25.
Liu et al., "Fast Simulation of Mass-Spring Systems", ACM Transactions on Graphics, vol. 32, No. 6, Nov. 2013, pp. 214:1-214:7.
Non-Final Office Action received for U.S. Appl. No. 14/171,729, dated Jan. 11, 2016, 16 pages.
Notice of Allowance received for U.S. Appl. No. 14/171,729, dated May 16, 2016, 10 pages.
Nvidia, "PxPruningStructure Struct Reference", available at <http://docs.nvidia.com/gameworks/content/gameworkslibrary/physx/apireference/files/structPxPruningStructure.html, 2013, 2 pages.
Weller et al., "A Brief Overview of Collision Detection", New Geometric Data Structures for Collision Detection and Haptics, Springer Series on Touch and Haptic Systems, Jul. 25, 2013, 39 pages.

\* cited by examiner image 100

EFFICIENT AND STABLE APPROACH TO ELASTICITY AND COLLISIONS FOR HAIR ANIMATION

CROSS REFERENCE TO RELATED APPLICATIONS

This application is a continuation of U.S. application Ser. No. 14/171,729, filed Feb. 3, 2014, now U.S. Pat. No. 9,443,341, which is hereby incorporated by reference in its entirety.

BACKGROUND

1. Field

This application relates generally to computer graphics and, more specifically, to animating hair in a computer-generated animation.

2. Related Art

Improvements in computer-generated animation have enabled animated films to portray characters and objects with remarkable realism. For example, clothing, hair, facial expressions, scene backgrounds, and the like are becoming increasingly complex, leading to animated films with visually stunning effects. Of these various animated scene elements, hair is especially difficult to animate due to the large number of hairs typically present on an animated character, the complex motions performed by the hair, and the numerous internal and external forces applied to each individual hair.

While processes have been developed to animate hair, existing processes may be computationally expensive and may produce inaccurate results.

SUMMARY

Processes for animating hair are described. One example process may include receiving data representing a plurality of hairs and a plurality of objects in a timestep of a frame of animation; populating a first tree to represent kinematic objects of the plurality of objects based on the received data; populate a second tree to represent dynamic objects of the plurality of objects based on the received data; creating a first elasticity preconditioner representing internal elastic energy of the plurality of hairs based on the received data; determining, based on the first tree and the second tree, a first set of potential contacts between two or more hairs of the plurality of hairs or between one or more hairs of the plurality of hairs and one or more objects of the plurality of objects; and determining positions of the plurality of hairs based on the determined first set of potential contacts and the first elasticity preconditioner.

In one example, determining positions of the plurality of hairs based on the determined first set of potential contacts and the first elasticity preconditioner may include iteratively: performing a Projected Gauss-Seidel algorithm using the first elasticity preconditioner to determine magnitudes of normal forces and friction forces for the first set of potential contacts; performing Cholesky back-substitution using the determined magnitudes of normal forces and friction forces for the first set of potential contacts to determine the positions of the plurality of hairs; and for iterations after the first iteration, detecting continuous collision contacts between two or more hairs of the plurality of hairs or between one or more hairs of the plurality of hairs and one or more objects of the plurality of objects.

In another example, the received data may define a motion of the plurality of objects, a shape of the plurality of hairs, and a response of the plurality of hairs to internal and external forces.

In another example, the received data may include: a motion sequence of one or more colliders that are capable of colliding with the plurality of hairs; a rest pose of the plurality of hairs; a motion sequence of a target pose of the plurality of hairs; and a plurality of constraints that model the plurality of hairs.

In another example, the plurality of hairs may be modeled as discrete elastic rods, wherein the plurality of constraints represent attractive forces between the discrete elastic rods.

In another example, the first tree and the second tree each comprise an axis-aligned bounding box tree.

In another example, the process may further include updating the second tree representing dynamic objects based on the determined positions of the plurality of hairs; creating a second elasticity preconditioner representative of internal elastic energy of the plurality of hairs based on the received data and the determined positions of the plurality of hairs; determining, based on the first tree and the updated second tree, a second set of potential contacts between two or more hairs of the plurality of hairs or between one or more hairs of the plurality of hairs and one or more objects of the plurality of objects; and determining new positions of the plurality of hairs based on the determined second set of potential contacts and the second elasticity preconditioner.

In another example, determining new positions of the plurality of hairs based on the determined second set of potential contacts and the second elasticity preconditioner comprises iteratively: performing a Projected Gauss-Seidel algorithm using the second elasticity preconditioner to determine magnitudes of normal forces and friction forces for the second set of potential contacts; performing Cholesky back-substitution using the determined magnitudes of normal forces and friction forces for the second set of potential contacts to determine positions of the plurality of hairs; and for iterations after the first iteration, detecting continuous collision contacts between two or more hairs of the plurality of hairs or between one or more hairs of the plurality of hairs and one or more objects of the plurality of objects.

In another example, creating the first elasticity preconditioner may include performing Cholesky factorization on a first matrix representing internal elastic energy of the plurality of hairs, and creating the second elasticity preconditioner may include performing Cholesky factorization on a second matrix representing internal elastic energy of the plurality of hairs.

Systems and computer-readable storage media for animating hair are also described.

BRIEF DESCRIPTION OF THE FIGURES

The present application can be best understood by reference to the following description taken in conjunction with the accompanying figures, in which like parts may be referred to by like numerals.

DETAILED DESCRIPTION

Figure 1:
FIG. 1 illustrates an exemplary rendered image that may be generated using a hair animation process according to various examples.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various embodiments are described below relating to processes for modeling and animating the elasticity of hair in conjunction with collision response, friction, and user defined constraints. In one example process, the hairs to be animated may be modeled using discrete elastic rods that are allowed to stretch, bend, and twist, but not shear. The hair output for each frame may be calculated using a combined elasticity and collisions solver that generates an elasticity preconditioner using Cholesky factorization, detecting possible collisions, and iteratively performing a Preconditioned Projected Gauss-Seidel (PPGS) algorithm to determine the magnitudes of the normal and friction forces for all potential contacts. The PPGS algorithm may be used to allow for efficient handling of hairs with high vertex counts, while retaining the advantages of a projective iterative solver enabling the processing of high contact and constraint counts. The process does not alternate between solving for elasticity and solving for collisions/friction. Instead, at each timestep, the appropriate normal and friction forces may be determined by solving the quadratic programming problem with an objective function determined by the internal dynamics and unilateral constraints arising from non-penetration and friction conditions. Tightly integrating the treatment of internal dynamics and collisions removes a possible source of visual inaccuracy since there is no need to limit strain rates during simulation.

Material curvatures may be linearized to ensure that the elastic energy Hessian is banded and semi-positive definite for any configuration of the discrete elastic rod. This may improve efficiency of the process since it ensures that the matrix of the linear system is tightly banded and symmetric positive definite for any timestep leading to more physically accurate bending response and the removal of degeneracies in the kinematic twist model. The energy Hessian is non-negative definite for all of the rod's configurations and the number of Hessian terms is significantly lower than in prior work. Moreover, the treatment includes damping forces for all types of deformations, such as stretch, bend, and twist. The time integrator may be applied uniformly to stretch, bend, and twist, and may remain robust for large timesteps.

1. Overview

FIG. 1 depicts an exemplary computer-generated image 100 that may be rendered using a hair animation process according to various examples. Notably, FIG. 1 depicts an image of a lion covered in hair of various lengths. To animate the hair in a visually realistic manner, each hair may be represented by a hair model that simulates the bending and twisting of the hair when internal and external forces are applied. As previously discussed, the process of animating the hair may be computationally expensive due to the large number of hairs typically present on an animated character, the complex motions performed by the hair, and the numerous internal and external forces applied to each hair.

2. Hair Model

Individual hair strands may be modeled as discrete elastic rods similar to those described in Bergou et al., "Discrete Elastic Rods," *SIGGRAPH* (*ACM Transactions on Graphics*), 27, 3 (August 2008), and Bergou et al., "Discrete Viscous Threads," *SIGGRAPH* (*ACM Transactions on Graphics*), 29, 4 (July 2010), but with some modifications. In particular, the rods may be allowed to stretch, bend, and twist, but not shear. Thus, the continuum model may be a generalization of the stretchable rods described in Kirchhoff, G., "Lieber das Gleichgewicht und die Bewegung eines unendlich dunnen elastichen Stabes," *Journal fur die reine und angewandte Mathematik*, 56 (1859). Geometrically, a smooth elastic rod may be represented as an adapted framed curve having a centerline $x(s) \in R^3$ and a material frame $[d_0(s); d_1(s); d_2(s)] \in SO(3)$, where s is the coordinate along the centerline.

The motion of the hair can be understood in terms of the change in shape from the undeformed (e.g., stress-free) configuration $\bar{x}(s); \bar{d}_\alpha(s)$ to the deformed shape $x(s, t); d\alpha(s, t)$ at the current time t.

a. Discretization

The centerline of the rod may be discretized as a sequence of n+2 vertices with positions $[x_0; x_1; \ldots; x_n; x_{n+1}]$. An orthonormal frame having the material directors $[d_0^j \; d_1^j \; d_2^j]$ may correspond to each edge $$e^j \stackrel{def}{=} x_{j+1} - x_j, \; 0 \le j \le n+1.$$

The frame may be adapted to the discretized centerline (e.g., one of the unit vectors comprising the orthonormal frame may be aligned with the tangent to the centerline):

$$d_2 = t^j \stackrel{def}{=} \frac{e^j}{|e^j|}, \quad (1)$$

where $|e^j|$ is the edge's length.

Since the material frame may be both orthonormal and adapted to the discretized centerline, it follows that the time evolution of the material frame at an edge may be represented by just one scalar, $\tau^j$, which is the angle that describes the incremental change in the orientation of the first material director $d_0^j$; $t_0 \le t \le t_0 + h$ relative to its orientation at the beginning of the simulation step. The vector of generalized coordinates that describes the configuration of a hair is then: $q = [x_0, \tau^0, \ldots, x_n, \tau^n, x_{n+1}] \in R^{4n+7}$.

In some examples, for simplicity, reference directors in addition to the material directors may not be used.

b. Forces

The Kirchhoff theory of rods assigns an elastic energy to an adapted framed curve from which internal elasticity forces are derived. The total elastic energy may include three terms corresponding to stretching, bending, and twisting:

$$E = E_s + E_b + E_t. \quad (2)$$

Each of these energy functions may be defined in terms of scalar functions that measure local deformations (e.g., strains). The derivation of stretching forces is described in Bergou et al., "Discrete Viscous Threads," *SIGGRAPH* (*ACM Transactions on Graphics*), 29, 4 (July 2010). The bending and twisting forces are described in detail below.

c. Bending and Twisting Forces

Discrete Curvature and Discrete Curvature Binormal Vector—For an internal vertex i, the discrete curvature may be defined as the turning angle $\Phi_i$ between two consecutive edges:

$$\Phi_i \stackrel{def}{=} \text{angle}(e^{i-1}, e^i), \quad 1 \le i \le n. \quad (3)$$

This leads to the following expression for the discrete curvature binormal:

$$(\Phi b)_i = \Phi_i \frac{t^{i-1} \times t^i}{|t^{i-1} \times t^i|}. \quad (4)$$

This choice for the discrete curvature ensures that for circle-shaped elastic rods, the bending energy is the same in the continuous and discrete cases, for all n≥3.

Discrete Material Curvatures—When attempting to define the discrete material curvatures at an interior vertex, the discrete curvature k, may be a vertex defined quantity, whereas the material directors $d_\alpha^{i-1}$; $d_\alpha^i$; $\alpha \in \{0, 1\}$ may be defined at the neighboring edges. Simple averaging of the neighboring edges' reference frames, as done in Bergou et al., "Discrete Viscous Threads," *SIGGRAPH* (*ACM Transactions on Graphics*), 29, 4 (July 2010), becomes increasingly inaccurate at higher bending and twisting angles, and degenerate if there is a 180 degree twist in the reference frame across the joint. To address this interpolation, material directors may instead be defined at vertices. Interpolated tangent vectors may first be defined as:

$$\tilde{t}_i \stackrel{def}{=} \frac{x_{i+1} - x_{i-1}}{|x_{i+1} - x_{i-1}|}. \quad (5)$$

The material directors at a vertex may be obtained by spherically interpolating with equal weights the parallel transported edge material directors:

$$\tilde{d}_{\alpha,i} = \text{slerp}_{\frac{1}{2}}(P_{t^{i-1}}^{\tilde{t}_i} \cdot d_\alpha^{i-1}, P_{t^i}^{\tilde{t}_i} \cdot d_\alpha^i), \quad (6)$$

where the parallel or zero-twist transport $P_{u_1}^{u_2}$ from a unit vector $u_1$ to another unit vector $u_2$ is the minimum angle rotation that aligns $u_1$ with $u_2$.

Finally, the material curvatures may be defined as $\Phi_{\alpha,i} = \tilde{d}\alpha^i \cdot (\Phi b)_i$.

Linearization of Angles—Given internal energies bending and twisting of a joint centered around vertex i defined as:

$$E_{b\alpha,i} = \frac{1}{2} \frac{k_{b\alpha,i}}{\bar{l}_i} (\phi_{\alpha,i} - \bar{\phi}_{\alpha,i})^2, \alpha \in \{0, 1\}, \quad (7)$$

$$E_{t,i} = \frac{1}{2} \frac{k_t}{\bar{l}_i} (\theta_i - \bar{\theta}_i)^2. \quad (8)$$

Differentiation of the analytic energy expressions may be an exhaustive exercise in derivation via the chain rule, and may produce a relatively large number of complicated terms, the evaluation of which may add a significant cost to the total simulation time. More importantly, some of the resulting energy Hessian terms may lead to an indefinite linear system that precludes their use in an implicit integration scheme. Further numerical methods, such as bi-conjugate gradient could overcome these terms, but the condition number of the matrix is already high and the resulting squaring may amplify convergence problems. Alternatively, identifying indefinite terms may be relatively simple for the stretching Hessian term that becomes indefinite under compressive loading, but may be more difficult for the bending and twisting Hessian terms due to their greater number and mathematical complexity.

Thus, the angles may instead be linearized in terms of the state vector. This may simplify the derivatives and all of the terms of the resulting Hessian may be positive definite. An additional advantage during implementation is that correctness of the analytic derivatives may be verified using direct numerical differencing of the energy expressions.

The angular variables may be linearized about the current system state vector q with respect to perturbations in the state variables of a joint's constituent vertices, written in terms of the neighboring edges $\{e^{i-1}, e^i\}$ and rotations $\{\tau^{i-1}; \tau^i\}$:

$$d\phi_{0,i} \approx \sum_{j=i-1}^{i} \left[(-1)^{i-j-1} u_i^j \cdot de^j + \frac{\phi_{1,j}}{2} d\tau^j\right], \quad (9)$$

$$d\phi_{1,i} \approx \sum_{j=i-1}^{i} \left[(-i)^{i-j-1} v_i^j \cdot de^j - \frac{\phi_{0,j}}{2} d\tau^j\right] \quad (10)$$

$$d\theta_i \approx \sum_{j=i-1}^{i} (-1)^{i-j-1} \left[\left(\tan\frac{\Phi}{2}\right) \frac{1}{\Phi|e^j|} (\Phi b)_i \cdot de^j - d\tau^j\right] \quad (11)$$

The vectors $u_i^j$ and $v_i^j$ may be approximations of the partial derivatives of the material curvature angles with respect to edge vectors.

$$u_i^j = (e^j \times \tilde{d}_{o,i}) \frac{1}{|e^j|^2} \beta_i \quad (12)$$

$$v_i^j = (e^j \times \tilde{d}_{1,i}) \frac{1}{|e^j|^2} \beta_i \quad (13)$$

Figure 2:
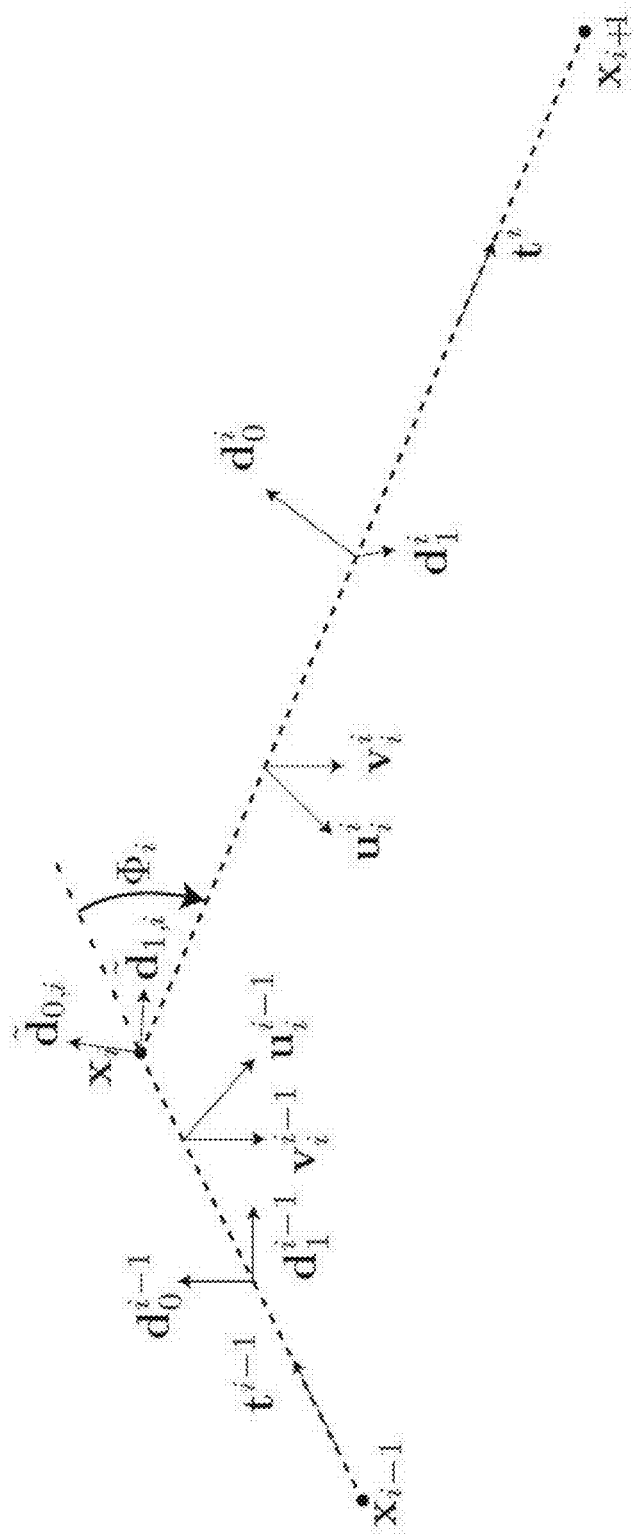
FIG. 2 illustrates an exemplary visual representation of variables used to model an animated hair.

FIG. 2 illustrates a visual representation of some of the variables listed above.

Some error may occur using the linearized angle approximation that may introduce a small unbalanced torque at high bending angles. This may only become apparent during tests of free body (e.g., unattached) tightly curled hairs after many timesteps. To compensate, a factor $\beta^j$, a well behaved function of turning angle $\Phi^j$, may be computed by applying conservation of angular momentum to a joint.

$$\beta(\Phi_i) = \frac{\Phi_i}{2}\left(\sin\left(\frac{\Phi_i}{2}\right)\right)^{-1} \tag{14}$$

Figure 3:
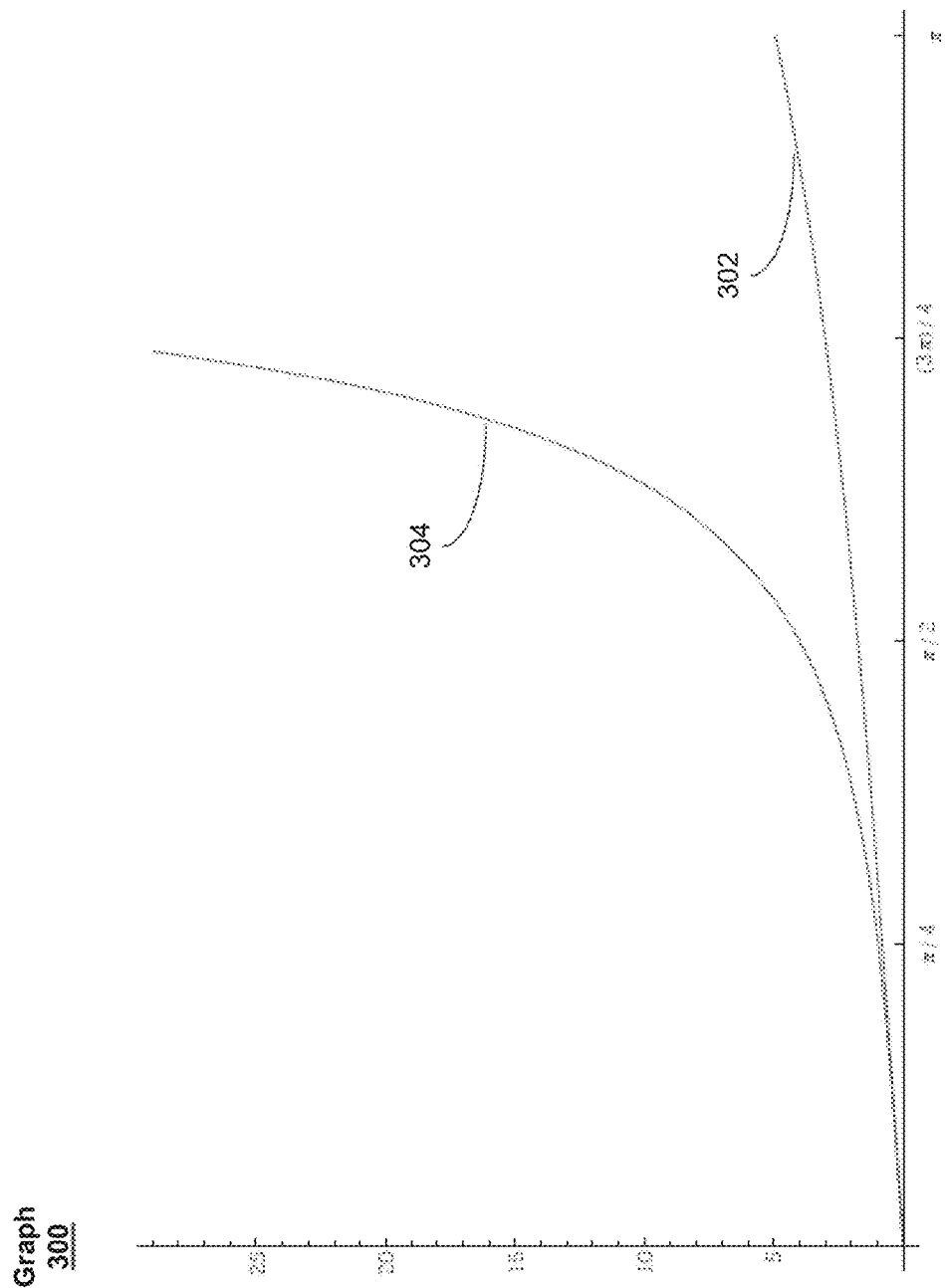
FIG. 3 illustrates an exemplary graph showing the variation of the bending force with turning angle for a reference case and a hair model as described herein.

Graph 300 of FIG. 3 shows the variation of bending force (y-axis) with turning angle (x-axis) for a reference case (represented by line 304) and an example using a hair model as described herein (represented by line 302) having unit edge lengths and a material director parallel to the binormal. As shown by line 302, when starting from the elastic energy of equation 7, a bending force that is bounded and varies almost linearly over the whole domain of turning angle values may be obtained. This is in contrast to the exponential nature of line 304. The mild non-linearity of line 302 may be due to the correction factor of equation 14. While the linearized angles may appear to complicate the math at first, they may actually simplify the computation of derivatives. Compared to the expressions that result from differentiating non-linearized angles, the expressions resulting from the techniques disclosed herein have relatively few components, making them easier to derive, verify, and ultimately less expensive to use.

d. Damping

In order to add damping, it can be assumed that hair is accurately approximated using a Kelvin-Voigt viscoelastic material. Each elastic force may have a corresponding damping force, the strains for the elastic and damping component may be equal, and the combined stress may be the sum of the elastic and damping stress.

Damping forces may be derived starting again from the elastic energy expressions by differentiating with respect to both position and time. With $c_s^j$ being the damping coefficient corresponding to stretch forces at edge j, the stretch damping force is:

$$-\frac{c_s^j}{k_s^j}\frac{d}{dt}\frac{\partial E_s^j}{\partial x_{i+1}} = -c_s^j(t^j \cdot (V_{i+1} - V_i))t^j \tag{15}$$

where $V_i$ is the velocity of vertex i.

Similarly, bend damping forces may be evaluated as:

$$-\frac{c_{b\alpha,i}}{k_{b\alpha,i}}\frac{d}{dt}\frac{\partial E_{b\alpha,i}}{\partial x_{i+1}} = \frac{c_{b\alpha,i}}{\bar{l}_i}\frac{d\phi_{\alpha,i}}{dt}u_j^i \tag{16}$$

where $$\frac{d\Phi_{i+1}}{dt} = u_j^i \cdot (V_{i+1} - V_i) - u_j^{i+1} \cdot (V_{i+2} - V_{i+1}) \tag{17}$$

and $c_{ab,i}$ is the damping coefficient at vertex i corresponding to bending in the α material direction. Finally, the twist damping force is:

$$-\frac{c_{t,i}}{k_{t,i}}\frac{d}{dt}\frac{\partial E_{t,i}}{\partial x_{i+1}} = -\frac{c_{t,i}}{\bar{l}_i}\frac{d\theta_i}{dt}\left(\tan\frac{\Phi}{2}\right)\frac{1}{\Phi(e^i)}(\Phi b)_i \tag{18}$$

where $$\frac{d\theta_i}{dt} = \left(\tan\frac{\Phi}{2}\right)\frac{1}{\Phi}(\Phi b)_i \cdot \left[\frac{(V_i - V_{i-1})}{|e^{i-1}|} + \frac{(V_{i+1} - V_i)}{|e^i|}\right] + \frac{d}{dt}(\tau^i - \tau^{i-1}) \tag{19}$$

and $c_{t,i}$ is the damping coefficient at vertex i corresponding to twisting.

e. Hair-to-Hair Constraints

Hair-to-hair sticking and separation may be modeled using soft constraints between vertices on different guide hairs or belonging to the same guide hair. Constraints may be modeled as damped springs that are biphasic in the sense that the compression stiffness and damping may be different from the stretching stiffness and damping. Optionally, the stretching stiffness may be allowed to diminish when the distance between the constrained points increases, to model the smaller resistance to separation of a hair clump with increased separation distance. Given the two ends $x_a$ and $x_b$ of such a fall-off constraint with rest length $\bar{l}$, we derive the stretching force from a potential function that is similar to the attractive term of the Lennard-Jones potential:

$$V(x_a, x_b) = -\frac{1}{1 + \frac{1}{2}k(|x_a - x_b| - \bar{l})^2} \tag{20}$$

This may result in a stretching stiffness equal to k at rest length and which decays smoothly with distance. As discussed in greater detail below in section 6, hair-to-hair constraints may be handled together with contact constraints.

3. Implicit Integration

Let $q=(x_0; \theta_0; \ldots; x_n; \theta_n; x_{n+1})$ be the vector of generalized coordinates and $h=t_{k+1}-t_k$ be the step size. The time integration scheme may be defined by the equations:

$$q_{k+1} - q_k = h(\dot{q}_k + \dot{q}_{k+1}) \tag{21}$$

$$M(\dot{q}_{k+1} - \dot{q}_k) = hf(q_{k+1}, \dot{q}_{k+1}) \tag{22}$$

where k denotes time, and f are the forces due to internal elasticity and damping. The term $q_{k+1}$ may be eliminated to directly relate the change in positions and angles to forces and the force Jacobian:

$$\dot{q}_{k+1} = \frac{1}{h}(q_{k+1} - q_k) - \dot{q}_k \tag{23}$$

$$\frac{M}{h^2}I(q_{k+1} - q_k) = \frac{M}{h}\dot{q}_k + f(q_{k+1}, \dot{q}_{k+1}) \tag{24}$$

Since f may depend non-linearly on q, several Newton iterations for each timestep may be used. For example, let $\Delta q_i$ be the estimate of $q_{k+1} - q_k$ after the i-th Newton iteration, with $\Delta q_0 = 0$. Using first-order Taylor series expansions around $q_k + \Delta q_i$, we obtain the following linear system of equations:

$$\left(\frac{M}{h^2}I - \frac{\partial f}{\partial q} - \frac{1}{h}\frac{\partial f}{\partial \dot{q}}\right)(\Delta q_{i+1} - \Delta q_i) = \tag{25}$$

$$\frac{M}{h^2}(-\Delta q_i + h\dot{q}_k) + f(q_k + \Delta q_i, \dot{q}_k) - \frac{\partial f}{\partial \dot{q}}\dot{q}_k$$

Collision detection and response (discussed below in section 6) as well as constraint satisfaction may be integrated within the implicit solver without alternating between them and the elasticity solve.

4. Hair Animation Process

Algorithm 1, shown below, may be performed for each timestep of a frame to be animated to backsolve equation 25 to solve for the state vector $q_{k+1}$.

Algorithm 1

```
populate AABB trees of purely kinematic objects
for iterations per timestep do
    populate AABB trees of dynamic objects
    build elasticity preconditioner using Cholesky factorization
    detect proximity contacts
    for iterations in PPGS do
        one Projected Gauss-Seidel sweep to update estimate of local collision and
        constraint forces
        solve equation 25 for Δq using Cholesky back-substitution
        Δq_k ← Δq_{k-1} + Δq
        if (PPGS iteration >1) detect continuous collision contacts
    end for
end for
```

Figure 4:
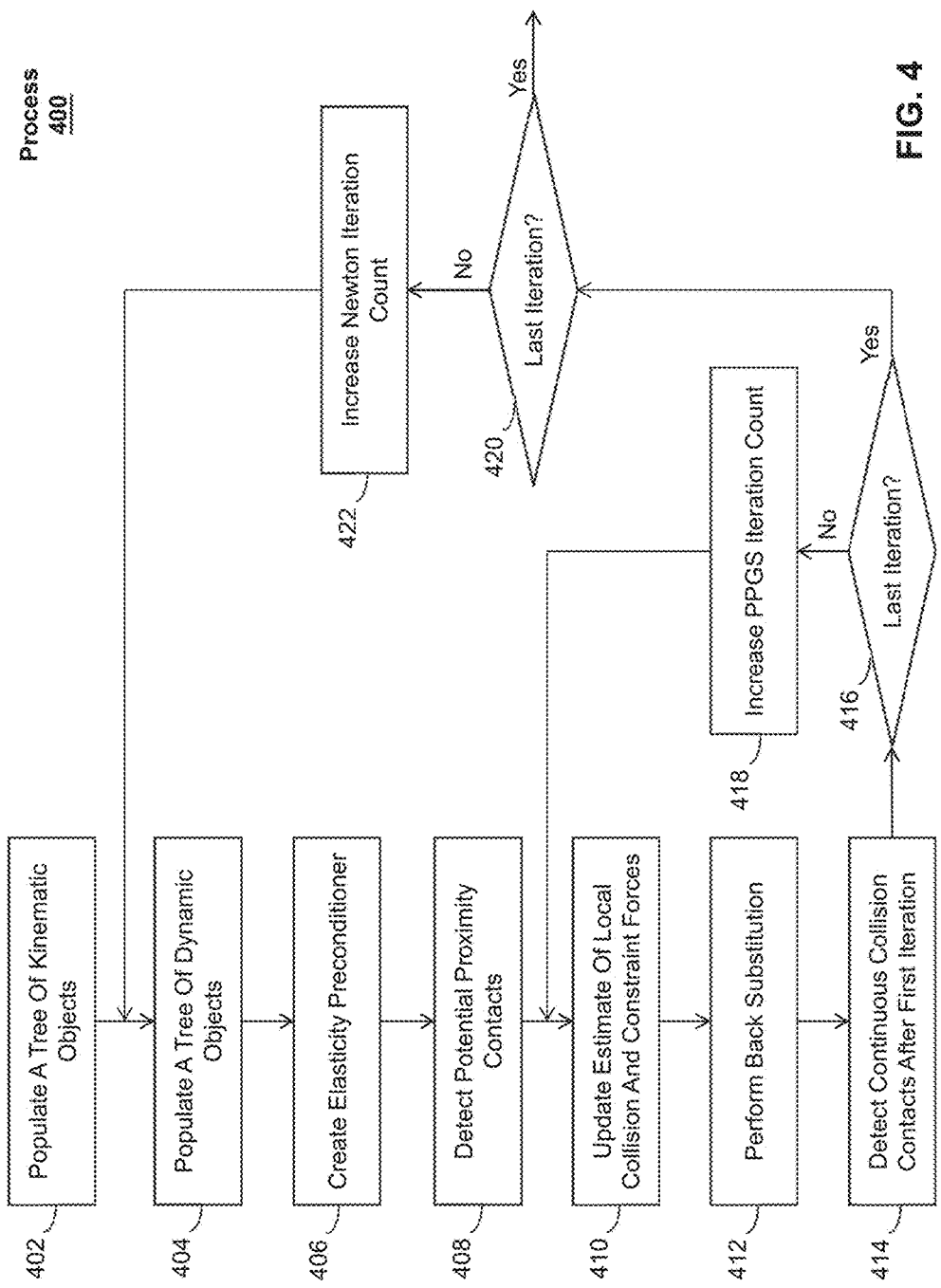
FIG. 4 illustrates an exemplary process for animating hair according to various examples.

A visual representation of algorithm 1 is illustrated by process 400 of FIG. 4. Generally, block 402 may correspond to the first step of algorithm 1, blocks 404, 406, 408, 410, 412, 414, 416, 418, 420, and 422 may correspond to the steps performed by the outer for-loop, and blocks 410, 412, 414, 416, and 418 may correspond to the steps performed by the inner for-loop. Process 400 may be performed for each timestep of a frame of an animation having any number of timesteps. Thus, prior to performing process 400, data representing a timestep of a frame of animation may be received. The data representing the timestep of a frame of animation may include one or more colliders (e.g., representations of skin, glasses, clothes, brushes, or the like) (motion sequence), rest pose of the hair (e.g., shape of the hair without any interfering forces) (typically static), target pose of the hair (simulated hair is attached to this shape) (motion sequence), and constraints (e.g., properties of the springs in the hair model).

At block 402, an axis-aligned bounding box (AABB) tree representing the spatial positions of kinematic objects in the timestep of the frame may be populated (e.g., creating and populating a new tree or updating a preexisting tree) based on the data representing the timestep of the frame of animation. The kinematic objects may include objects in the timestep of the frame that are not dynamically affected during simulation. A more detailed discussion of an AABB tree is provided in Van Den Bergen et al., "Efficient Collision Detection of Complex Deformable Models Using AABB Trees," J. Graphics Tools, 2 (1998).

At block 404, an AABB tree representing the spatial positions of dynamic objects in the timestep of the frame may be populated (e.g., creating and populating a new tree or updating a preexisting tree) based on the data representing the timestep of the frame of animation. The dynamic objects may include objects that may be dynamically affected during simulation.

At block 406, an elasticity preconditioner may be created using, for example, Cholesky factorization. A linear system of equations with a symmetric and positive definite matrix A can be solved in a numerically stable and efficient way using the Cholesky factorization $A=LL^T$. The stability of the Cholesky factorization follows from the fact that the elements of L do not grow since they are tightly bounded by the diagonal elements of A: $L_{ij}^2 \leq A_{ii}$. A more detailed discussion of this can be found in Golub et al., "Matrix Computations," The Johns Hopkins University Press (1996). One consequence of the stability is that no pivoting may be required. The memory operations used by pivoting may severely impact the run-time efficiency of a computing system that relies heavily on memory caches and multi-threading. Moreover, when the matrix A is banded, computing the Cholesky factorization may not result in any fill-in outside the band.

At block 408, potential proximity contacts (e.g., hair to hair contacts or hair to object contacts) may be detected based on the AABB trees representing the kinematic objects and dynamic objects. The potential proximity contacts may be detected by testing for overlap between various primitive pair types, such as vertex-vertex, vertex-edge, vertex-face, and edge-edge. All vertices may have an associated radius r that denotes either a hair's collision radius or the thickness of a surface. During the proximity computation, radius r may be linearly interpolated along edges and across faces to yield the continuous ($G^0$) offset collision surfaces. Proximity detection may be computed at only the beginning and ending state of a given timestep. Collision contact information may be maintained for all primitive pairs that overlap, as well as pairs in near proximity. Due to the use of a projective iterative solver, including extra non-colliding proximities does not adversely affect the quality of the solution, and should the primitives come into contact during the timestep, the constraint may activate.

Blocks 410, 412, and 414 may then be iteratively performed for a number of times equal to a PPGS iteration count (e.g., 2, 3, 4, or more) that may be predefined or selected by a user in order to generate an estimate of the magnitudes of the normal and friction forces for the potential proximity contacts detected at block 408. In particular, at blocks 410 and 412, a PPGS algorithm may be used to determine the magnitudes of the normal and friction forces for all potential proximity contacts determined at block 408. PPGS is an iterative method for solving the following quadratic programming problem arising from evolving the dynamical state subject to both internal elasticity forces and contact constraints:

$$\text{Minimize with respect to } \Delta q: \frac{1}{2}\Delta q^T A \Delta q - b^T \Delta q \quad (26)$$

$$\text{subject to: } C\Delta q \leq c \quad (27)$$

where A and b are, respectively, the left side and right side of equation 25 and (C, c) express the non-penetration constraints as well as Coulomb-type constraints on the magnitudes of friction forces.

To illustrate the operation of PPGS, assume at first that there only exists contact constraints and no elastic forces exist. At the time of detection, the following quantities for each contact may be computed: penetration depth p, normal restitution vector n, and points of contact on either primitive expressed as barycentric weights $\beta_a$ and $\beta_b$. The following linear system for the normal forces required to resolve the constraints over the given timestep may be constructed (see Baraff et al., "Large Steps in Cloth Simulation," *Proceedings of SIGGRAPH*, (1998), for the equality constraints case):

$$\frac{h^2}{2} JM^{-1}J^T\lambda = p, \quad \lambda \geq 0. \quad (28)$$

Once solved for lambda, the normal force corresponding to constraint j may be computed as $F_{nj}=\lambda_j n_j$. Matrix J may be the sparse m×3n matrix encoding the m constraint's inter-connectivity. A 1×3 blockwise element definition of J corresponding to constraint j and vertex i is:

$$J_{ji}=n_j(\beta_{aji}-\beta_{bji}) \quad (29)$$

The linear complementarity problem of equation 28 may be solved using the Projected Gauss-Seidel (PGS) method described in detail in Catto, E., "Iterative Dynamics With Temporal Coherence," *In Proc. of the Game Developers Conference* (2005), which determines the active set of positive (e.g., pushing) non-zero normal forces required to satisfy the constraints. However, the formulation does not include internal elasticity forces, so the result of simply solving the equation is local to the neighborhood of the constraint.

This may be suitable for limp hair with many vertices colliding against a smooth collision object, but for high resolution hair colliding against a sharp collision feature, or hair with high bending stiffness, global information may be needed in order to determine the correct restitution force. Due to the relatively slow propagation of information in PGS, resolving the constraint in adverse scenarios may take a relatively high iteration count, otherwise the solution will contain large strains or unresolved collisions.

After the normal force has been determined, the associated friction force due to the contact may be computed as:

$$F_f = \min\left(\frac{2}{h^2 w}\Delta x, \mu\lambda\frac{\Delta x}{|\Delta x|}\right) \quad (30)$$

where $\Delta x$ is the relative motion between the two points of the contact, and $w=(1/m_a)+(1/m_b)$ is the sum of the inverse local masses involved in the contact.

Thus, the first option of the minimum operation represents the force required to completely arrest the motion between the two points of contact. The second option represents the maximum available friction force with a coefficient of friction $\mu$, which may be the kinetic coefficient $\mu_k$ if the magnitude of relative motion exceeds some small distance, or a larger coefficient of static friction $\mu_s$ if the magnitude of relative motion does not exceed the small distance.

Note that with the appropriate barycentric weights and constraint length, this collision mechanism may also be employed for constraints between any point on the hair, collision surface, or arbitrary point in space, though in such cases there may be no frictional force component.

At block 412, once all of the components of constraint forces are known, they may be added to the right side of the elasticity system (equation 25), which may then be back-solved using the prior factorization to find new estimates for this iteration of the state vector $q_{k+1}$.

Performing blocks 410 and 412 in this way allows a PPGS solve loop requiring only a single Cholesky factorization of the elasticity matrix per Newton iteration to be used. Within the PPGS loop is performed an inexpensive (relative to a factorization) backsolve to propagate far-field elasticity information to all nodes of the system (e.g., all vertices of a single guide hair).

At block 414, for PPGS iterations counts of blocks 410, 412, and 414 that are greater than one, temporal collision detection may be employed to identify collisions of fast moving primitives otherwise missed in the static proximity test. The process may be further optimized by excluding any pair whose relative motion does not exceed their combined collision radius, leading to computational savings in regions with small motion. Additionally, the offset radius r for temporal collision may not be used, thereby reducing the order of the polynomial equation for time of contact and allowing for consideration of only vertex-face and edge-edge collisions. One potential downside may be that a grazing collision that occurs mid-timestep may be missed, but such transient errors have not been noticed and would only occur in regions of fast motion.

At block 416, it may be determined if the last iteration of blocks 410, 412, and 414 has been reached (e.g., current PPGS iteration count is equal to the predefined or user-defined PPGS iteration count). If it is determined that it is not the last iteration, the process may proceed to block 418, where the current PPGS iteration count may be increased. After increasing the current PPGS iteration count, the process may return to block 410. Blocks 410, 412, and 414 may be iteratively performed for a number of times equal to the predetermined or user-defined PPGS iteration count.

After being iterated a number of times equal to the PPGS iteration count, a positive determination may be made at block 416, resulting in process 400 proceeding to block 420. At block 420, it may be determined if the last iteration of blocks 404, 406, 408, 410, 412, and 414 has been reached (e.g., current Newton iteration count is equal to a predefined or user-defined Newton iteration count, such as 2, 3, 4, or more). If it is determined that it is not the last iteration, the process may proceed to block 422, where the current Newton iteration count may be increased. After increasing the current Newton iteration count, the process may return to block 404, where the tree of dynamic objects may be updated based on the previous state of the tree of dynamic objects and the estimate of the magnitudes of the normal and friction forces for the potential proximity contacts as determined by iteratively performing blocks 410, 412, and 414. Blocks 404, 406, 408, and the iterative loop of blocks 410, 412, and 414 may be repeated for a number of times equal to the predefined or user-defined Newton iteration count in a manner similar to that described above.

After iterating blocks 404, 406, 408, 410, 412, and 414 a number of times equal to the predefined or user-defined Newton iteration count, a positive determination may be made at block 420, thereby ending process 400 for the present timestep of the frame. The output of process 400 may be a motion sequence of the determined positions of the modeled and simulated hairs. Process 400 may be repeated any number of times for any number of timesteps in a frame of animation, with the output of process 400 for one timestep being used as an input for the performance of process 400 for a subsequent timestep.

5. Parallelization

The inclusion of hair-to-hair collisions and constraints make the parallelization of the algorithm more complex; without them the system parallelization would be simple since each hair would depend only on its internal elasticity and collision against solid objects. Neighboring hairs may be grouped together into an object of the appropriate size to balance overhead and workloads, which in some examples, may be between 800-1200 (e.g., 1000) vertices per object. The collision detection and state update may be computed independently for each object.

Inter-object and intra-object collisions may be detected once per Newton iteration, while user constraints may be given as inputs to the system. From the list of constraints and contacts may be created a list of all interacting object pairs.

Algorithm 2, shown below, may be performed to create a list of groups of tasks that may be run sequentially. Each group may include a fully parallelizable list of task pairs. An object may appear no more than once in each group. A typical large hair simulation may have somewhere on the order of 10,000 contacts. Due to the sparse nature of contacts and constraints, a contact typically connects to a small set of neighbors. Consequently, the number of groups may be relatively small, typically on the order of 10. Each group may be run in a fully parallel loop. All threads may synchronize prior to beginning work on the next group. To avoid stalling, the order of object pair tasks may be sorted in descending cost, which may be estimated as the number of individual contacts or constraints between the two objects.

---

Algorithm 2

---

```
sort unassigned task list by job size
create schedule list
while unassigned task list is not empty do
   create group list
   for each task in unassigned task list do
      if neither object from task is already in group list then move task from
      unassigned task list to group list
      end if
   end for
   append group list to schedule
end while
return schedule
```

---

In some examples, the cost of scheduling may be less than 1% of the overall budget and may only be recomputed after new collisions are detected.

Figure 5:
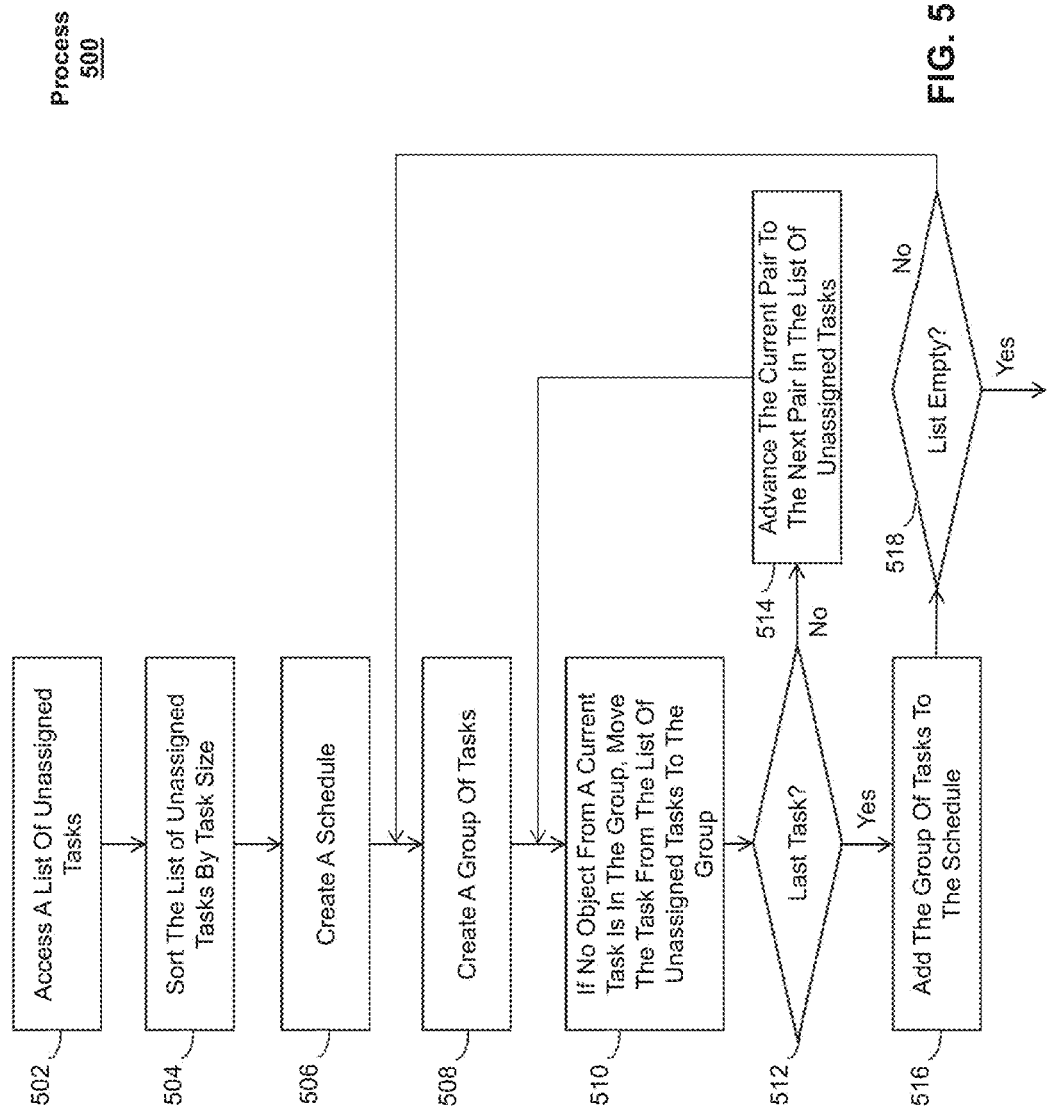
FIG. 5 illustrates an exemplary process for scheduling the parallel processing of tasks according to various examples.

A visual representation of algorithm 2 is illustrated by process 500 of FIG. 5. Generally, block 504 may correspond to the first step of algorithm 2, block 506 may correspond to the second step of algorithm 2, blocks 508, 510, 512, 514, 516, and 518 may correspond to the steps performed by the while-loop, and blocks 510, 512, and 514 may correspond to the steps performed by the for-loop.

Figure 6:
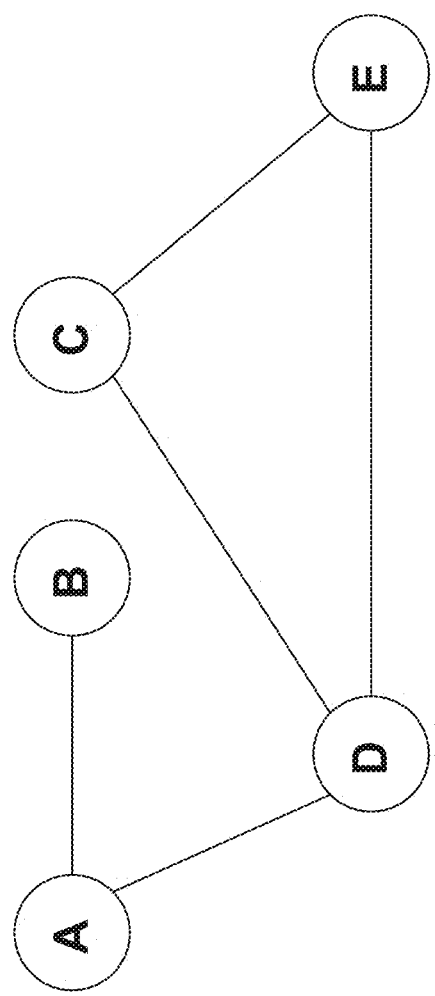
FIGS. 6-8 illustrate a visual representation of parallel scheduling of tasks using the process of FIG. 5.

At block 502, a list of unassigned tasks may be accessed. The tasks may include pairs of interacting objects. To illustrate, FIG. 6 illustrates a visual representation of objects A, B, C, D, and E connected together by edges representing collisions and constraints between the connected objects. The tasks associated with these objects include pairs of objects connected together by edges (e.g., tasks AB, AD, DC, CE, and DE).

Figure 7:
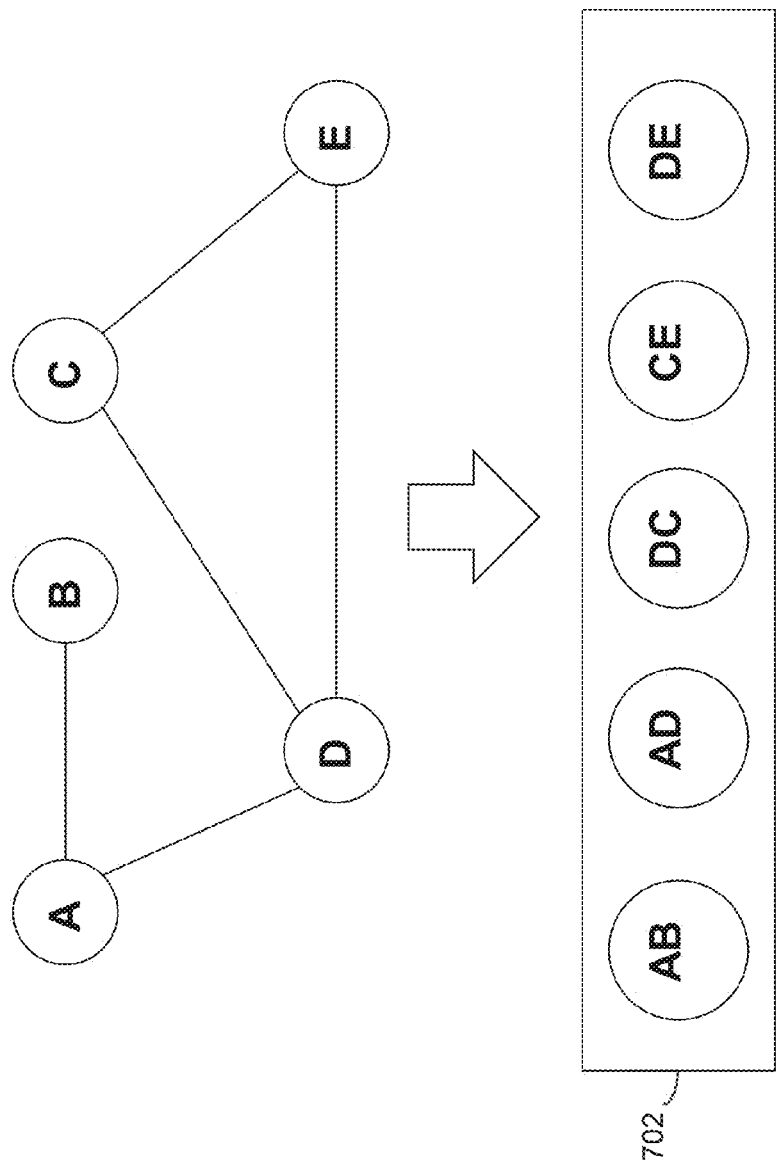

At block 504, the list of unassigned tasks may be sorted from largest task size to smallest task size. Continuing with the example provided above, FIG. 7 shows the sorted lists of tasks 702 generated from the connected objects A, B, C, D, and E of FIG. 6. As shown, task AB is the largest task and task DE is the smallest task.

At block 506, a schedule data structure may be created. The schedule may be empty when created, but after performing process 500 may include groups of tasks that may be run sequentially, where each group may include a fully parallelizable list of task pairs.

At block 508, a group of tasks may be created. The group may be empty when created, but may be used to store a list of tasks that may be run sequentially.

At block 510, it may be determined whether or not the current task in the sorted list of unassigned tasks includes an object that exists in the group created at block 508. On the first iteration of block 510, the current task may be selected to be the first task in the sorted listed of unassigned tasks. If it is determined that the current task does not include an object that exists in the group created at block 508, the current task may be removed from the sorted list of unassigned tasks and placed in the group of tasks created at block 508.

To illustrate, using the example provided above, it may be determined whether an object from the first task AB is in the group of tasks. Since neither object A nor B is in the group, task AB may be removed from the sorted list of unassigned tasks and placed in the group. As a result, the group may include task AB and the sorted list of unassigned tasks may include tasks AD, DC, CE, and DE.

At block 512, it may be determined whether the current task is the last remaining task in the sorted list of unassigned tasks. If it is determined that the current task is not the last task, the process may proceed to block 514, where the next task in the sorted list of unassigned tasks may be set as the current task. Blocks 510, 512, and 514 may be repeated for each task in the sorted list of unassigned tasks.

To illustrate, using the example provided above, since task AB was not the last task in the sorted list of unassigned tasks, a negative determination may be made at block 512, causing the process to proceed to block 514. At block 514, the next task in the sorted list of unassigned tasks (task AD) may be set as the current task.

Once each task in the sorted list of unassigned tasks is evaluated using blocks 510, 512, and 514, a positive determination may be made at block 512, causing the process to proceed to block 516. At block 516, the group of tasks may be added to the schedule created at block 506.

To illustrate, using the example provided above, block 510 may be performed to determine whether an object of task AD is contained in the group of tasks. Since object A of task AD is already in the group (as part of task AB), task AD may not be added to the group at block 510. Blocks 512, 514, and 510 may then be performed to determine whether an object of task DC is contained in the group of tasks. Since neither object D nor object C of task DC is in the group of tasks, task DC may be removed from the sorted list of unassigned tasks and added to the group. Thus, the group may then include tasks AB and DC, and the sorted list of unassigned tasks may include tasks AD, CE, and DE. Blocks 512, 514, and 510 may be performed two additional times to determine whether objects from tasks CD and DE are contained in the group of tasks. Since tasks CE and DE contain objects C and D, respectively, which are also included in the group, neither task may be added to the group. The group containing tasks AB and DC may then be added to the schedule at block 516.

At block 518, it may be determined whether the sorted list of unassigned tasks is empty. If it is determined that the list is not empty, the process may return to block 508, where another group of tasks may be created, and the remaining tasks in the sorted list of unassigned tasks may be processed by iteratively performing blocks 510, 512, and 514.

Blocks 508, 510, 512, 514, 516, and 518 may be iteratively performed until each task in the list of unassigned tasks is assigned to a group and added to the schedule. Once complete, a positive determination may be made at block 518 to end process 500.

To illustrate, using the example provided above, since the sorted list of unassigned objects is not empty, a negative determination may be made at block 518, and the process may return to block 508. At block 508, a new empty group may be created and it may be determined whether an object of task AD is contained in the group of tasks. Since the group is empty, neither object A nor object D is contained in the group. As a result, task AD may be removed from the sorted list of unassigned tasks and added to the group at block 510. The group may then contain task AD, and the sorted list of unassigned tasks may include tasks CE and DE. Blocks 512, 514, and 510 may then be performed to determine whether an object of task CE is contained in the group of tasks. Since neither object C nor object E of task CE is in the group of tasks, task CE may be removed from the sorted list of unassigned tasks and added to the group. Thus, the group may then include tasks AD and CE, and the sorted list of unassigned tasks may include task DE. Blocks 512, 514, and 510 may be performed again to determine whether objects from task DE are contained in the group of tasks. Since task DE contain objects that are also included in the group, task DE may not be added to the group. The group containing tasks AD and CE may then be added to the schedule at block 516.

Since the sorted list of unassigned objects is not empty, a negative determination may be made at block 518, and the process may return to block 508. At block 508, a new empty group may be created, and it may be determined whether an object of task DE is contained in the group of tasks. Since the group is empty, neither object D nor object E is contained in the group. As a result, task DE may be removed from the sorted list of unassigned tasks and added to the group at block 510. The group may then contain task DE and the sorted list of unassigned tasks may be empty. The group containing task DE may be added to the schedule at block 516 and the process may end after determining that the sorted list of unassigned objects is empty at block 518.

Figure 8:
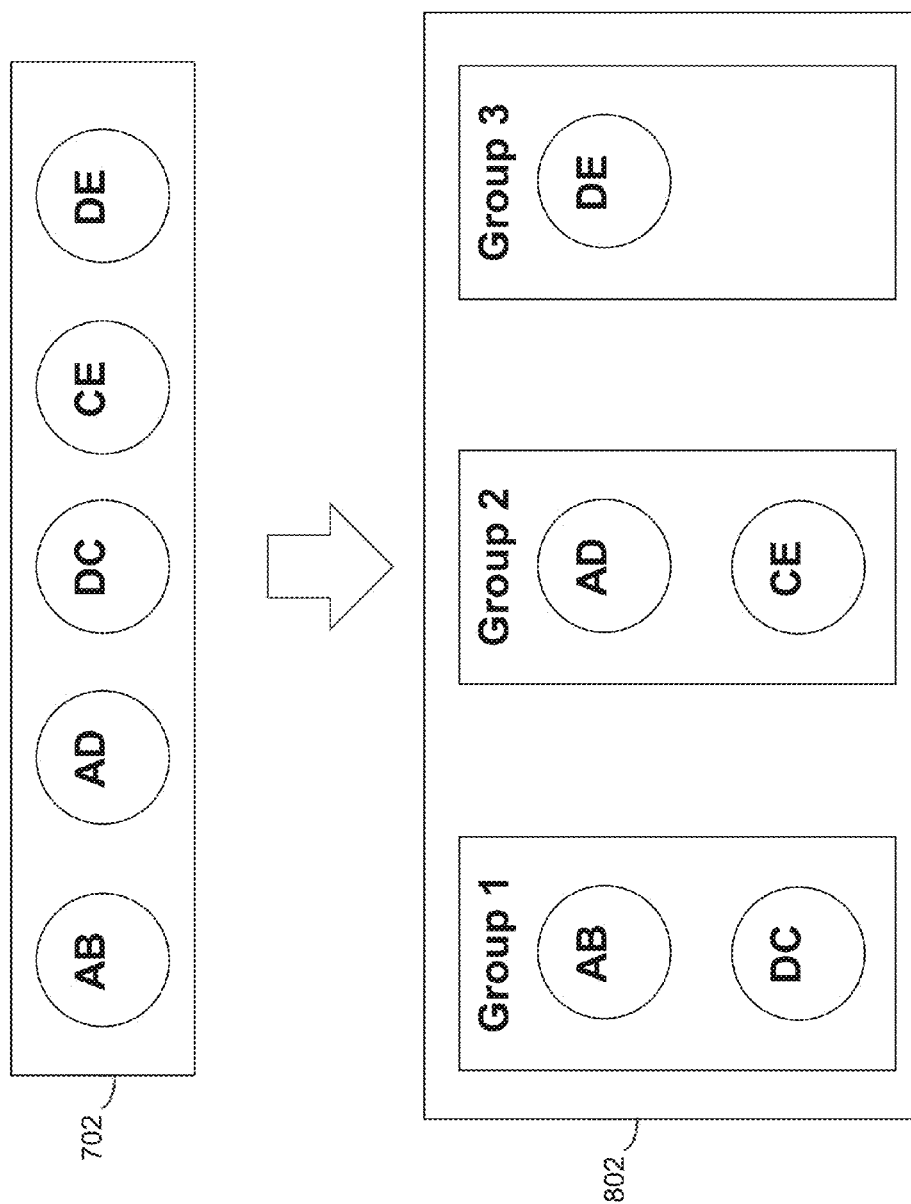

FIG. 8 shows the resulting schedule 802 that may be created from sorted unassigned list of tasks 702 using process 500. As shown, group 1 may include tasks AB and DC, group 2 may include tasks AD and CE, and group 3 may include task DE. Since the tasks in different groups do not depend on each other, they may be evaluated in parallel.

6. Results and Discussion

Figure 9:
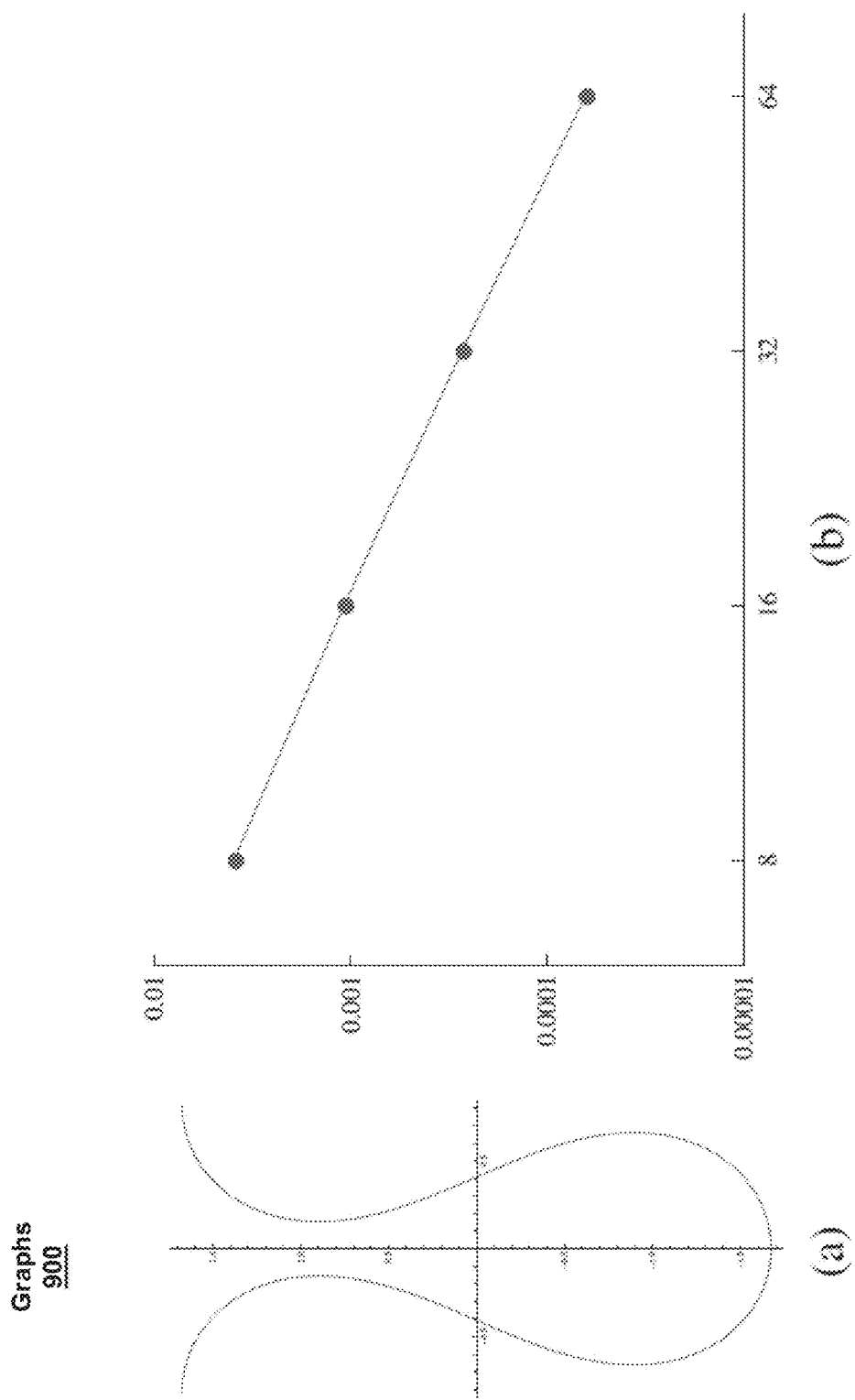
FIG. 9 illustrates an exemplary graph showing a comparison of an example output generated using the process of FIG. 4 with a known analytical solution.

*Elastica* curve—Graphs 900 of FIG. 9 illustrate a comparison of an example output created using process 400 with a known analytical solution to the problem of static equilibrium of a continuous elastic rod clamped at both ends. The solution belongs to the family of inflectional *elastica* curves, which have closed forms expressible in terms of Jacobi elliptic functions and are labeled by a continuous parameter m. A more detailed discussion is described in section 13 of Levien, R., "The *Elastica*: A Mathematical History," *Tech. Rep., University of California, Berkeley* (2008). In some examples, m=7/10.

Helical buckling—The interaction between bending and twisting may cause a number of instability phenomena. One of these is helical buckling where a naturally straight rod clamped at both ends and twisted maintains its straight shape for as long as the amount of twist is smaller than a threshold value and buckles into the shape of a helix with variable radius past that threshold. Process 400 may produce the correct behavior.

Collisions with surfaces—In an animation scene, hair may interact with character's skin, clothing, and other objects in the environment. These objects are kinematic in the sense that, from the perspective of hair simulation, their motion and shape deformations are prescribed procedurally. Using process 400, collisions may be handled robustly.

Hair-to-hair collisions—Hair-to-hair collisions with friction may be used to prevent volume loss and to model the sliding effects between different layers of hair. Collisions may be detected between different strands as well as within the same hair. To ensure a robust and stable collision response, both vertex-edge and edge-edge proximity detection may be used to generate contacts.

Hair-to-hair constraints—To generate the hair-to-hair constraints (see section 2b), proximity detection may be performed on the rest shape of the hair. A maximum number of constraints that a hair vertex may belong to may be set. The stiffness and damping parameters of constraints may be set according to the position of the constraint within the hair style.

The performance and scaling shown in Table 1 illustrates an example performance of the hair animation process described herein in average milliseconds per frame for a variety of cases encompassing a large range of vertices, constraints, and average contacts. Given the use of a fixed iteration count, and the use of a direct solver on the dense banded linear system, the expected average running time is $O(n+m)$ where n is the number of vertices, and m is the number of constraints and contacts.

TABLE 1

| Model | Hairs | Hair Points | Colliders Points | Constraints | Average Contacts | Average Frame | Slowest Frame | Average Collision Detection Time |
|---|---|---|---|---|---|---|---|---|
| A | 300 | 5918 | 15795 | 38432 | 17184 | 352 ms | 471 ms | 108 ms |
| A (8× density) | 300 | 47456 | 15795 | 95397 | 423937 | 1547 ms | 2180 ms | 407 ms |
| B | 243 | 2430 | 10534 | 6015 | 1118 | 109 ms | 123 ms | 37 ms |

TABLE 1-continued

| Model | Hairs | Hair Points | Colliders Points | Constraints | Average Contacts | Average Frame | Slowest Frame | Average Collision Detection Time |
|---|---|---|---|---|---|---|---|---|
| C | 45 | 450 | 10534 | 4485 | 433 | 82 ms | 91 ms | 33 ms |
| D | 256 | 6400 | 6850 | 19060 | 30517 | 304 ms | 482 ms | 111 ms |

Table 2 shows an example performance of the disclosed hair animation process over a range of workloads and threads. In the case of a single thread, performance scales roughly linearly with increase of vertices, despite a nearly quadratic increase in the number of contacts. However, as the number of threads increases, this efficiency diminishes. This may be attributed to the difficulty of parallelizing the constraint resolution, but note that performance decreases to 75% scaling efficiency in the case of 4 processors, and is still above 50% when utilizing 12 processors.

TABLE 2

| Model | Hair Points | Constraints | Average Contacts | 1 Processor | 4 Processor | 8 Processor | 12 Processor |
|---|---|---|---|---|---|---|---|
| A | 5918 | 38432 | 17184 | 739 ms | 423 ms | 392 ms | 352 ms |
| A (4 × density) | 23759 | 48059 | 123221 | 2657 ms | 1067 ms | 814 ms | 766 ms |
| A (8 × density) | 47456 | 95397 | 423937 | 6882 ms | 2519 ms | 1824 ms | 1547 ms |

Parallelization efficiency may be best in the case with the heaviest workload (e.g., 47000 vertices), ranging from 68% for four processors to 37% for 12 processors. This difference may be attributed to a difference between ideal threading efficiency compared to the non-trivial task of threading so many constraints and contacts which in all test cases outnumber the vertex counts by an order of magnitude.

Figure 10:
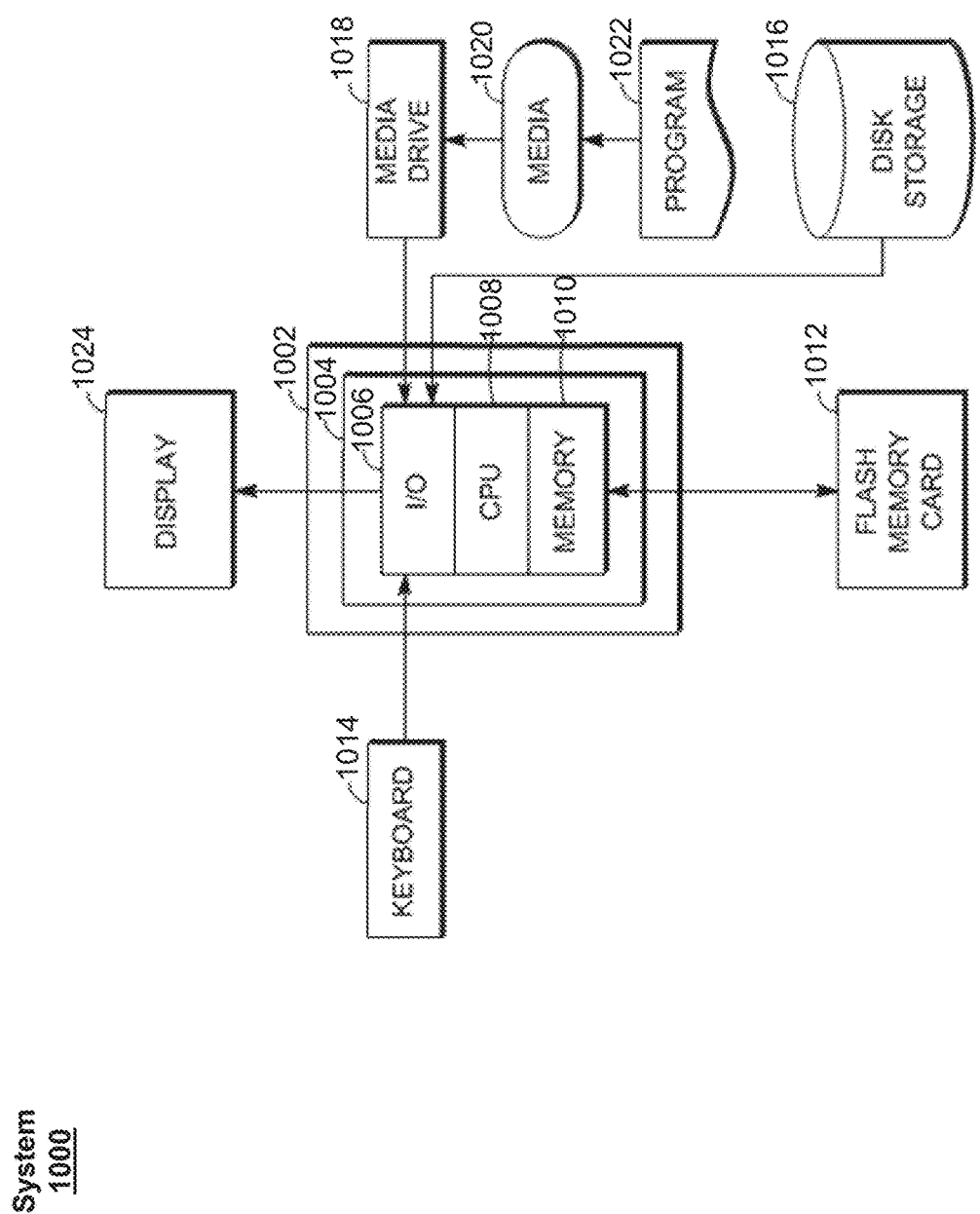
FIG. 10 illustrates an exemplary computing system.

FIG. 10 depicts an exemplary computing system 1000 with a number of components that may be used to perform the above-described processes 400 and 500. The main system 1002 includes a motherboard 1004 having an input/output (I/O) section 1006, one or more central processing units (CPUs) 1008, and a memory section 1010, which may have a flash memory card 1012 related to it. The I/O section 1006 is connected to a display 1024, a keyboard 1014, a disk storage unit 1016, and a media drive unit 1018. The media drive unit 1018 can read/write a non-transitory computer-readable storage medium 1020, which can contain programs 1022 or data for performing processes 400 and 500.

At least some values based on the results of the above-described processes can be saved for subsequent use. Additionally, a non-transitory computer-readable storage medium can be used to store (e.g., tangibly embody) one or more computer programs for performing any one of the above-described processes 400 or 500 by means of a computer. The computer program may be written, for example, in a general-purpose programming language (e.g., Pascal, C, C++) or some specialized application-specific language.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, each of the individual variations described and illustrated herein has discrete components and features that may be readily separated from or combined with the features of any of the other several embodiments without departing from the scope or spirit of the various embodiments.

What is claimed is:

1. A computer-implemented method for animating hair, the method comprising:
   receiving data representing a plurality of hairs and a plurality of objects in a timestep of a frame of animation;
   populating a first tree to represent kinematic objects of the plurality of objects based on the received data;
   populating a second tree to represent dynamic objects of the plurality of objects based on the received data;
   creating a first elasticity preconditioner representing internal elastic energy of the plurality of hairs based on the received data;
   determining, based on the first tree and the second tree, a first set of potential contacts between two or more hairs of the plurality of hairs or between one or more hairs of the plurality of hairs and one or more objects of the plurality of objects; and
   determining positions of the plurality of hairs based on the determined first set of potential contacts and the first elasticity preconditioner, wherein determining positions of the plurality of hairs comprises iteratively:
   determining magnitudes of normal forces and friction forces for the first set of potential contacts;
   determining the positions of the plurality of hairs; and
   for iterations after the first iteration, detecting continuous collision contacts between two or more hairs of the plurality of hairs or between one or more hairs of the plurality of hairs and one or more objects of the plurality of objects.

2. The method of claim 1, wherein:
   determining magnitudes of normal forces and friction forces for the first set of potential contacts includes performing a Projected Gauss-Seidel algorithm using the first elasticity preconditioner; and
   determining the positions of the plurality of hairs includes performing Cholesky back-substitution using the determined magnitudes of normal forces and friction forces for the first set of potential contacts.

3. The method of claim 1, wherein the received data defines a motion of the plurality of objects, a shape of the plurality of hairs, and a response of the plurality of hairs to internal and external forces.

4. The method of claim 1, wherein the received data comprises:
- a motion sequence of one or more colliders that are capable of colliding with the plurality of hairs;
- a rest pose of the plurality of hairs;
- a motion sequence of a target pose of the plurality of hairs; and
- a plurality of constraints that model the plurality of hairs.

5. The method of claim 4, wherein the plurality of hairs are modeled as discrete elastic rods, and wherein the plurality of constraints represent attractive forces between the discrete elastic rods.

6. The method of claim 1, wherein the first tree and the second tree each comprise an axis-aligned bounding box tree.

7. The method of claim 1, further comprising:
- updating the second tree representing dynamic objects based on the determined positions of the plurality of hairs;
- creating a second elasticity preconditioner representative of internal elastic energy of the plurality of hairs based on the received data and the determined positions of the plurality of hairs;
- determining, based on the first tree and the updated second tree, a second set of potential contacts between two or more hairs of the plurality of hairs or between one or more hairs of the plurality of hairs and one or more objects of the plurality of objects; and
- determining new positions of the plurality of hairs based on the determined second set of potential contacts and the second elasticity preconditioner.

8. The method of claim 7, wherein determining new positions of the plurality of hairs based on the determined second set of potential contacts and the second elasticity preconditioner comprises iteratively:
- performing a Projected Gauss-Seidel algorithm using the second elasticity preconditioner to determine magnitudes of normal forces and friction forces for the second set of potential contacts;
- performing Cholesky back-substitution using the determined magnitudes of normal forces and friction forces for the second set of potential contacts to determine positions of the plurality of hairs; and
- for iterations after the first iteration, detecting continuous collision contacts between two or more hairs of the plurality of hairs or between one or more hairs of the plurality of hairs and one or more objects of the plurality of objects.

9. The method of claim 7, wherein creating the first elasticity preconditioner comprises performing Cholesky factorization on a first matrix representing internal elastic energy of the plurality of hairs, and wherein creating the second elasticity preconditioner comprises performing Cholesky factorization on a second matrix representing internal elastic energy of the plurality of hairs.

10. A non-transitory computer-readable storage medium for animating hair, the non-transitory computer-readable storage medium comprising computer-executable instructions for:
- receiving data representing a plurality of hairs and a plurality of objects in a timestep of a frame of animation;
- populating a first tree to represent kinematic objects of the plurality of objects based on the received data;
- populating a second tree to represent dynamic objects of the plurality of objects based on the received data;
- creating a first elasticity preconditioner representing internal elastic energy of the plurality of hairs based on the received data;
- determining, based on the first tree and the second tree, a first set of potential contacts between two or more hairs of the plurality of hairs or between one or more hairs of the plurality of hairs and one or more objects of the plurality of objects; and
- determining positions of the plurality of hairs based on the determined first set of potential contacts and the first elasticity preconditioner, wherein determining positions of the plurality of hairs comprises iteratively:
  - determining magnitudes of normal forces and friction forces for the first set of potential contacts;
  - determining the positions of the plurality of hairs; and
  - for iterations after the first iteration, detecting continuous collision contacts between two or more hairs of the plurality of hairs or between one or more hairs of the plurality of hairs and one or more objects of the plurality of objects.

11. The non-transitory computer-readable storage medium of claim 10, wherein:
- determining magnitudes of normal forces and friction forces for the first set of potential contacts includes performing a Projected Gauss-Seidel algorithm using the first elasticity preconditioner; and
- determining the positions of the plurality of hairs includes performing Cholesky back-substitution using the determined magnitudes of normal forces and friction forces for the first set of potential contacts.

12. The non-transitory computer-readable storage medium of claim 10, wherein the received data defines a motion of the plurality of objects, a shape of the plurality of hairs, and a response of the plurality of hairs to internal and external forces.

13. The non-transitory computer-readable storage medium of claim 10, wherein the received data comprises:
- a motion sequence of one or more colliders that are capable of colliding with the plurality of hairs;
- a rest pose of the plurality of hairs;
- a motion sequence of a target pose of the plurality of hairs; and
- a plurality of constraints that model the plurality of hairs.

14. The non-transitory computer-readable storage medium of claim 13, wherein the plurality of hairs are modeled as discrete elastic rods, and wherein the plurality of constraints represent attractive forces between the discrete elastic rods.

15. The non-transitory computer-readable storage medium of claim 10, wherein the first tree and the second tree each comprise an axis-aligned bounding box tree.

16. The non-transitory computer-readable storage medium of claim 10, further comprising computer-executable instructions for:
- updating the second tree representing dynamic objects based on the determined positions of the plurality of hairs;
- creating a second elasticity preconditioner representative of internal elastic energy of the plurality of hairs based on the received data and the determined positions of the plurality of hairs;
- determining, based on the first tree and the updated second tree, a second set of potential contacts between two or more hairs of the plurality of hairs or between one or more hairs of the plurality of hairs and one or more objects of the plurality of objects; and determining new positions of the plurality of hairs based on the determined second set of potential contacts and the second elasticity preconditioner.

17. The non-transitory computer-readable storage medium of claim 16, wherein determining new positions of the plurality of hairs based on the determined second set of potential contacts and the second elasticity preconditioner comprises iteratively:

performing a Projected Gauss-Seidel algorithm using the second elasticity preconditioner to determine magnitudes of normal forces and friction forces for the second set of potential contacts;

performing Cholesky back-substitution using the determined magnitudes of normal forces and friction forces for the second set of potential contacts to determine positions of the plurality of hairs; and for iterations after the first iteration, detecting continuous collision contacts between two or more hairs of the plurality of hairs or between one or more hairs of the plurality of hairs and one or more objects of the plurality of objects.

18. The non-transitory computer-readable storage medium of claim 16, wherein creating the first elasticity preconditioner comprises performing Cholesky factorization on a first matrix representing internal elastic energy of the plurality of hairs, and wherein creating the second elasticity preconditioner comprises performing Cholesky factorization on a second matrix representing internal elastic energy of the plurality of hairs.

19. A system for animating hair, the system comprising:
a non-transitory computer-readable storage medium comprising computer-executable instructions for:

receiving data representing a plurality of hairs and a plurality of objects in a timestep of a frame of animation;

populating a first tree to represent kinematic objects of the plurality of objects based on the received data;

populating a second tree to represent dynamic objects of the plurality of objects based on the received data;

creating a first elasticity preconditioner representing internal elastic energy of the plurality of hairs based on the received data;

determining, based on the first tree and the second tree, a first set of potential contacts between two or more hairs of the plurality of hairs or between one or more hairs of the plurality of hairs and one or more objects of the plurality of objects; and determining positions of the plurality of hairs based on the determined first set of potential contacts and the first elasticity preconditioner, wherein determining positions of the plurality of hairs comprises iteratively:

determining magnitudes of normal forces and friction forces for the first set of potential contacts;

determining the positions of the plurality of hairs; and for iterations after the first iteration, detecting continuous collision contacts between two or more hairs of the plurality of hairs or between one or more hairs of the plurality of hairs and one or more objects of the plurality of objects; and a processor capable of executing the instructions.

20. The system of claim 19, wherein:

determining magnitudes of normal forces and friction forces for the first set of potential contacts includes performing a Projected Gauss-Seidel algorithm using the first elasticity preconditioner; and determining the positions of the plurality of hairs includes performing Cholesky back-substitution using the determined magnitudes of normal forces and friction forces for the first set of potential contacts.

21. The system of claim 19, wherein the received data defines a motion of the plurality of objects, a shape of the plurality of hairs, and a response of the plurality of hairs to internal and external forces.

22. The system of claim 19, wherein the received data comprises:

a motion sequence of one or more colliders that are capable of colliding with the plurality of hairs;

a rest pose of the plurality of hairs;

a motion sequence of a target pose of the plurality of hairs; and a plurality of constraints that model the plurality of hairs.

23. The system of claim 22, wherein the plurality of hairs are modeled as discrete elastic rods, and wherein the plurality of constraints represent attractive forces between the discrete elastic rods.

24. The system of claim 19, wherein the first tree and the second tree each comprise an axis-aligned bounding box tree.

25. The system of claim 19, wherein the non-transitory computer-readable storage medium further comprises computer-executable instructions for:

updating the second tree representing dynamic objects based on the determined positions of the plurality of hairs;

creating a second elasticity preconditioner representative of internal elastic energy of the plurality of hairs based on the received data and the determined positions of the plurality of hairs;

determining, based on the first tree and the updated second tree, a second set of potential contacts between two or more hairs of the plurality of hairs or between one or more hairs of the plurality of hairs and one or more objects of the plurality of objects; and determining new positions of the plurality of hairs based on the determined second set of potential contacts and the second elasticity preconditioner.

26. The system of claim 25, wherein determining new positions of the plurality of hairs based on the determined second set of potential contacts and the second elasticity preconditioner comprises iteratively:

performing a Projected Gauss-Seidel algorithm using the second elasticity preconditioner to determine magnitudes of normal forces and friction forces for the second set of potential contacts;

performing Cholesky back-substitution using the determined magnitudes of normal forces and friction forces for the second set of potential contacts to determine positions of the plurality of hairs; and for iterations after the first iteration, detecting continuous collision contacts between two or more hairs of the plurality of hairs or between one or more hairs of the plurality of hairs and one or more objects of the plurality of objects.

27. The system of claim 25, wherein creating the first elasticity preconditioner comprises performing Cholesky factorization on a first matrix representing internal elastic energy of the plurality of hairs, and wherein creating the second elasticity preconditioner comprises performing Cholesky factorization on a second matrix representing internal elastic energy of the plurality of hairs.

* * * * *